United States Patent
Janakiraman et al.

(10) Patent No.: US 10,927,899 B2
(45) Date of Patent: Feb. 23, 2021

(54) SPLINED COUPLING

(71) Applicant: Goodrich Actuation Systems Limited, Solihull (GB)

(72) Inventors: Rajasekaran Janakiraman, Bangalore (IN); John H. Harvey, Wolverhampton (GB); James Holding, Cannock (GB); Shrishail Niranji, Bangalore (IN); Shirish Naik, Bangalore (IN)

(73) Assignee: GOODRICH ACTUATION SYSTEMS LIMITED, Solihull (GB)

( * ) Notice: Subject to any disclaimer, the term of this patent is extended or adjusted under 35 U.S.C. 154(b) by 525 days.

(21) Appl. No.: 15/870,065

(22) Filed: Jan. 12, 2018

(65) Prior Publication Data
US 2019/0154087 A1 May 23, 2019

(30) Foreign Application Priority Data

Nov. 17, 2017 (IN) .............................. 201741041193

(51) Int. Cl.
| | | |
|---|---|---|
| *F16D 1/116* | (2006.01) | |
| *B64C 13/34* | (2006.01) | |
| *F16D 1/10* | (2006.01) | |

(52) U.S. Cl.
CPC .............. *F16D 1/116* (2013.01); *B64C 13/34* (2013.01); *F16D 2001/103* (2013.01); *F16D 2250/0084* (2013.01); *Y10T 403/7033* (2015.01)

(58) Field of Classification Search
CPC ......... B64C 13/34; F16D 1/027; F16D 1/033; F16D 1/072; F16D 1/076; F16D 1/116;
(Continued)

(56) References Cited

U.S. PATENT DOCUMENTS 2,611,632 A  9/1952  Harris
3,673,814 A * 7/1972  Carman .................. F16D 3/185
                                                                     464/156
(Continued)

FOREIGN PATENT DOCUMENTS

CN   201155530 Y   11/2008
EP     3222868 A1    9/2017
(Continued)

OTHER PUBLICATIONS

The Extended European Search Report for Application No. 18206178.8-1012; dated Feb. 15, 2019; Feb. 21, 2019; 6 pages.
(Continued)

*Primary Examiner* — Josh Skroupa
(74) *Attorney, Agent, or Firm* — Cantor Colburn LLP (57) ABSTRACT

A splined coupling assembly includes: a transfer gear having a first end, a second end opposite the first end, and a plurality of splines at the first end. The splined coupling assembly also includes a transfer housing having a first side, a second side opposite the first side, and a tubular portion located at the second side. The tubular portion includes a plurality of splines. The plurality of splines of the transfer housing are configured to mesh with the plurality of splines of the transfer gear. The splined coupling assembly further includes a shear ring located in a shear ring groove in the tubular portion- and a retainer configured to retain the shear ring within the shear ring grove.

15 Claims, 7 Drawing Sheets

(58) Field of Classification Search
CPC .............. F16D 3/185; F16D 2001/103; F16D 2250/0023; F16D 2250/0084; Y10T 403/49; Y10T 403/7033
USPC ................. 464/16, 157, 158, 159, 162, 182; 403/274, 359.5
See application file for complete search history.

(56) References Cited

U.S. PATENT DOCUMENTS

| | | | | |
|---|---|---|---|---|
| 4,037,430 A | * | 7/1977 | Wright | F16D 3/185 464/158 |
| 4,156,531 A | * | 5/1979 | Boucquey | F16D 3/185 277/572 |
| 4,989,712 A | * | 2/1991 | Janiszewski | F16D 3/06 464/160 |
| 5,393,267 A | * | 2/1995 | Munyon | F16D 3/185 464/159 |
| 5,816,625 A | | 10/1998 | Clarke | |
| 8,012,030 B2 | * | 9/2011 | Cermak | F16D 1/116 464/182 |
| 8,277,330 B2 | * | 10/2012 | Szentmihalyi | F16D 1/10 464/182 |
| 8,425,142 B2 | * | 4/2013 | Disser | F16D 1/116 403/359.5 |
| 10,253,819 B2 | * | 4/2019 | Sherlock | F16D 1/116 |
| 10,443,658 B2 | * | 10/2019 | Yoo | F16D 1/116 |

FOREIGN PATENT DOCUMENTS

| | | |
|---|---|---|
| GB | 2117487 A1 | 10/1983 |
| WO | 2011039633 A1 | 4/2011 |

OTHER PUBLICATIONS

European Examination Report for European Application No. 18206178.8, Application Filing Date: Nov. 14, 2018; dated Mar. 12, 2020, 4 pages.

* cited by examiner

SPLINED COUPLING

CROSS-REFERENCE TO RELATED APPLICATIONS

This application claims the benefit of Provisional Indian Application No. 201741041193 filed Nov. 17, 2017, which is incorporated herein by reference in its entirety.

BACKGROUND

The subject matter disclosed herein generally relates to flight control surface actuation systems, and more specifically to an apparatus and a method for transferring torque in a flight control surface actuation system.

Flight control surface actuation is commonly accomplished by a series of interconnected actuators in a flight control surface actuation system. The actuators may be connected through a drive system. The drive system should be designed to accommodate small angular misalignment along with transmitting torque within the system. The drive system should also possess the capacity to sustain higher axial loading due to wing bending.

BRIEF SUMMARY

According to one embodiment, a splined coupling assembly is provided. The splined coupling assembly comprising: a transfer gear having a first end, a second end opposite the first end, and a plurality of splines at the first end; and a transfer housing having a first side, a second side opposite the first side, and a tubular portion located at the second side, the tubular portion comprising: a plurality of splines, wherein the plurality of splines of the transfer housing are configured to mesh with the plurality of splines of the transfer gear; a shear ring located in a shear ring groove in the tubular portion; and a retainer configured to retain the shear ring within the shear ring grove.

In addition to one or more of the features described above, or as an alternative, further embodiments may include that the tubular portion further comprises: a first face, a second face opposite the first face, a radially inward surface, and a radially outward surface opposite the radially inward surface, wherein the second face includes an orifice that opens to a chamber defined by the radially inward surface, and wherein the plurality of splines of the transfer housing are internal splines located on the radially inward surface and the plurality of splines of the transfer gear are external splines.

In addition to one or more of the features described above, or as an alternative, further embodiments may include a retainer ring located within the chamber and proximate the second side; and a disc located within the chamber and proximate the plurality of internal splines, wherein the shear ring groove is located in the radially inward surface, and wherein the shear ring is located between the disc and the retainer ring.

In addition to one or more of the features described above, or as an alternative, further embodiments may include that the retainer is configured to retain the retainer ring within the chamber and proximate the second side, wherein the retainer initiates at a location in the chamber and wraps around the second face, the radially outward surface, and the first face.

In addition to one or more of the features described above, or as an alternative, further embodiments may include that the retainer terminates prior to reaching the external splines.

In addition to one or more of the features described above, or as an alternative, further embodiments may include that the retainer extends into the chamber radially inward of the retainer ring, the shear ring, and the disc.

In addition to one or more of the features described above, or as an alternative, further embodiments may include an O-ring seal located in a seal groove on an outer surface of the transfer gear, wherein the O-ring seal is configured to form a sealed connection with the retainer to prevent lubricating fluid migration out of the chamber in an axial direction.

In addition to one or more of the features described above, or as an alternative, further embodiments may include that the retainer terminates at the disc.

According to another embodiment a flight control surface actuation system is provided. The flight control surface actuation system comprising: an actuator configured to actuate a flight control surface; a transmission operably connected to the actuator; a drive shaft operably connected to the transmission; and a splined coupling assembly operably connecting the drive shaft to the transmission, the spline coupling assembly comprising: a transfer gear having a first end, a second end opposite the first end, and a plurality of splines at the first end; a transfer housing having a first side, a second side opposite the first side, and a tubular portion located at the second side, the tubular portion comprising: a plurality of splines, wherein the plurality of splines of the transfer housing are configured to mesh with the plurality of splines of the transfer gear; a shear ring located in a shear ring groove in the tubular portion; and a retainer configured to retain the shear ring within the shear ring grove.

In addition to one or more of the features described above, or as an alternative, further embodiments may include that the tubular portion further comprises: a first face, a second face opposite the first face, a radially inward surface, and a radially outward surface opposite the radially inward surface, wherein the second face includes an orifice that opens to a chamber defined by the radially inward surface, and wherein the plurality of splines of the transfer housing are internal splines located on the radially inward surface and the plurality of splines of the transfer gear are external splines.

In addition to one or more of the features described above, or as an alternative, further embodiments may include a retainer ring located within the chamber and proximate the second side; and a disc located within the chamber and proximate the plurality of internal splines, wherein the shear ring groove is located in the radially inward surface, and wherein the shear ring is located between the disc and the retainer ring.

In addition to one or more of the features described above, or as an alternative, further embodiments may include that the retainer is configured to retain the retainer ring within the chamber and proximate the second side, wherein the retainer initiates at a location in the chamber and wraps around the second face, the radially outward surface, and the first face.

In addition to one or more of the features described above, or as an alternative, further embodiments may include that the first side of the transfer housing further comprises: a flange located at the first side, the flange including one or more through holes.

In addition to one or more of the features described above, or as an alternative, further embodiments may include one or more fasteners operably connecting the first side of the transfer housing to the drive shaft, wherein each fastener is located in one of the one or more through holes.

In addition to one or more of the features described above, or as an alternative, further embodiments may include that the transfer gear further comprises: a plurality of external splines at the second end of the transfer gear.

In addition to one or more of the features described above, or as an alternative, further embodiments may include that the splined coupling assembly is operably connected to the transmission through the external splines at the second end.

According to another embodiment, a method of manufacturing a splined coupling assembly is provided. The method comprising: forming a transfer gear having a first end, a second end opposite the first end, and a plurality of external splines at the first end; forming a transfer housing having a first side, a second side opposite the first side, and a tubular portion located at the second side, the tubular portion comprising a first face, a second face opposite the first face, a radially inward surface, a radially outward surface opposite the radially inward surface, and a plurality of internal splines in the radially inward surface, wherein the plurality of internal splines are configured to mesh with the external splines of the transfer gear, and wherein the second face includes an orifice that opens to a chamber defined by the radially inward surface; and inserting the first end of the transfer gear into the chamber of the transfer housing; aligning the plurality of external splines with the plurality of internal splines, such that the plurality of external splines mesh with the plurality of internal splines; and securing a retainer around the tubular portion of the transfer housing such that the retainer initiates at a location in the chamber and wraps around the second face, the radially outward surface, and the first face.

In addition to one or more of the features described above, or as an alternative, further embodiments may include that prior to the inserting the method further comprises: forming a sheer ring grove in the radially inward surface of the transfer housing; sliding a disc into the chamber, the disc being located proximate the internal splines; inserting a sheer ring into the sheer ring groove; and sliding a retainer ring into the chamber, the retainer ring being located proximate the second side of the transfer housing, wherein the sheer ring is located in between the disc and the retainer ring in an axial direction.

In addition to one or more of the features described above, or as an alternative, further embodiments may include that the securing further comprises: sliding the retainer around the tubular portion of the transfer housing such that a first end of the retainer extends past the first face of the tubular portion and a second end of the retainer is located within the chamber, wherein the second end is located opposite the first end; and swaging the first end of the retainer around the first face of the tubular portion.

In addition to one or more of the features described above, or as an alternative, further embodiments may include that the securing further comprises: swaging a second end of the retainer such that when the second end is within the chamber the second end forms a sealed connection with the O-ring seal and wraps around and radially inward of the retainer ring, the shear ring, and the disc, wherein the second end is located opposite a first end of the retainer; sliding the retainer around the tubular portion of the transfer housing such that the first end of the retainer extends past the first face of the tubular portion and the second end is located within the chamber; and swaging the first end of the retainer around the first face of the tubular portion.

Technical effects of embodiments of the present disclosure include a splined coupling assembly in a flight control surface actuation system having a transfer gear and a transfer housing to transfer torque in the flight control surface actuation system while the splined coupling assembly restricts axial movement between the transfer gear and the transfer housing.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
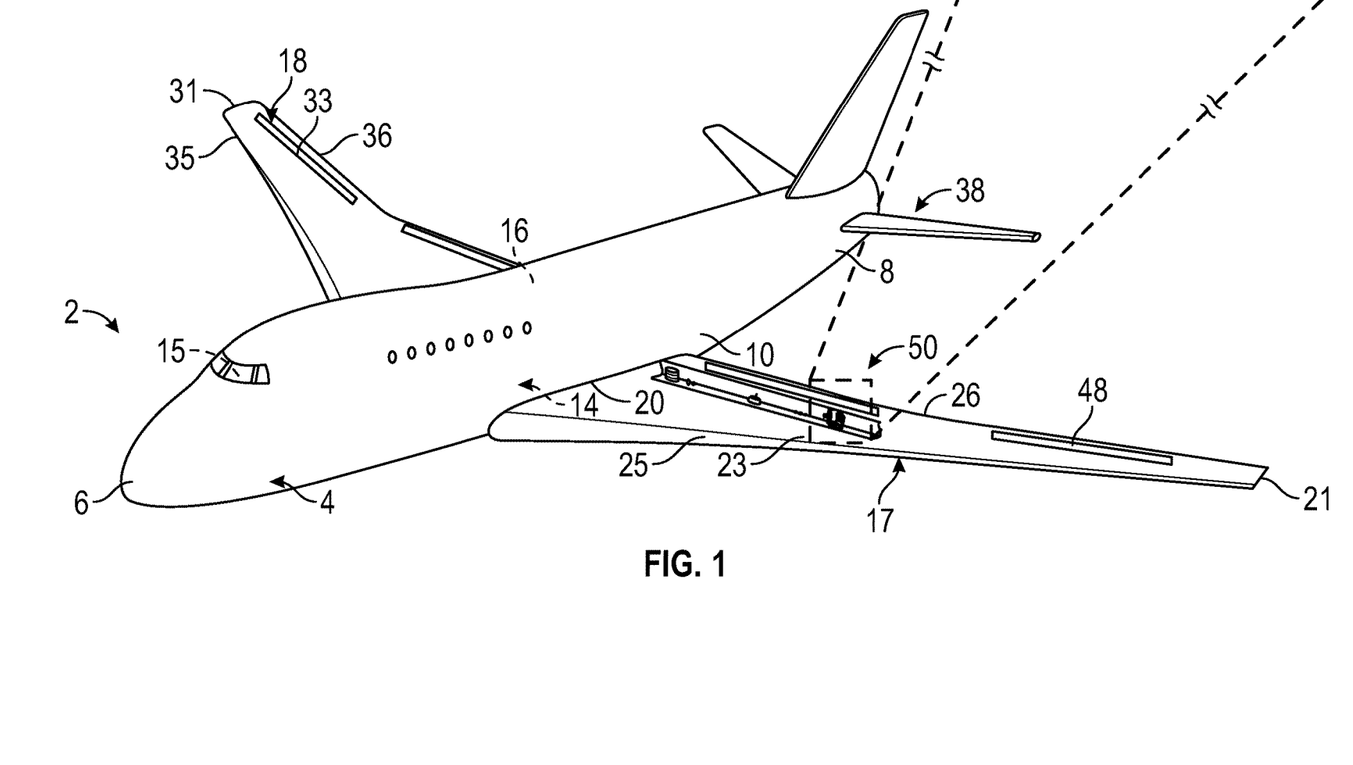
FIG. 1 is a perspective view of an aircraft, according to an embodiment of the present disclosure.
Figure 1A:
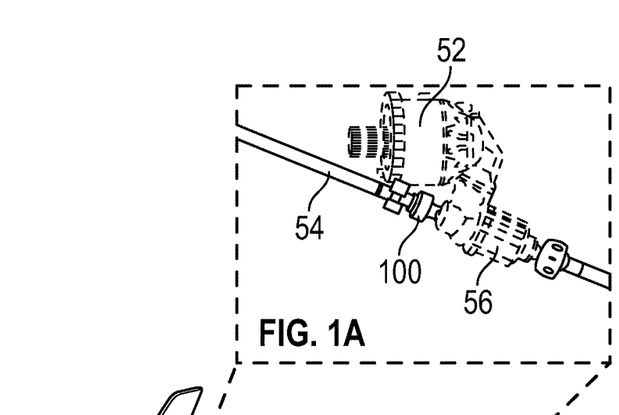
FIG. 1A is an enlarged view of a splined coupling assembly within the aircraft of FIG. 1, according to an embodiment of the present disclosure.

Referring now to FIGS. 1 and 1A, which shows a perspective view of an aircraft 2 that may incorporate embodiments of the present disclosure. Aircraft 2 includes a fuselage 4 extending from a nose portion 6 to a tail portion 8 through a body portion 10. Body portion 10 houses an aircraft cabin 14 that includes a crew compartment 15 and a passenger compartment 16. Body portion 10 supports a first wing 17 and a second wing 18. First wing 17 extends from a first root portion 20 to a first tip portion 21 through a first airfoil portion 23. First airfoil portion 23 includes a leading edge 25 and a trailing edge 26. Second wing 18 extends from a second root portion (not shown) to a second tip portion 31 through a second airfoil portion 33. Second airfoil portion 33 includes a leading edge 35 and a trailing edge 36. Tail portion 8 includes a stabilizer 38. The aircraft 2 includes one or more flight control surfaces 48 configured to adjust the lift and drag characteristics of the first wing 17 and the second wing 18. Flight control surfaces 48 may also be located on the stabilizer 38. The flight control surfaces 48 may include but are not limited to flaps, ailerons, elevators, rudders, spoilers, slats, and any other known flight control surface known to one of skill in the art. The flight control surfaces 48 are actuated by a flight control surface actuation system 50. The flight control surface actuation system 50 comprises one or more actuators 52 operably connected to each other through drive shafts 54 and transmissions 56. A drive shaft 54 operably connects to a transmission 56 through a splined coupling assembly 100.

Figure 2A:
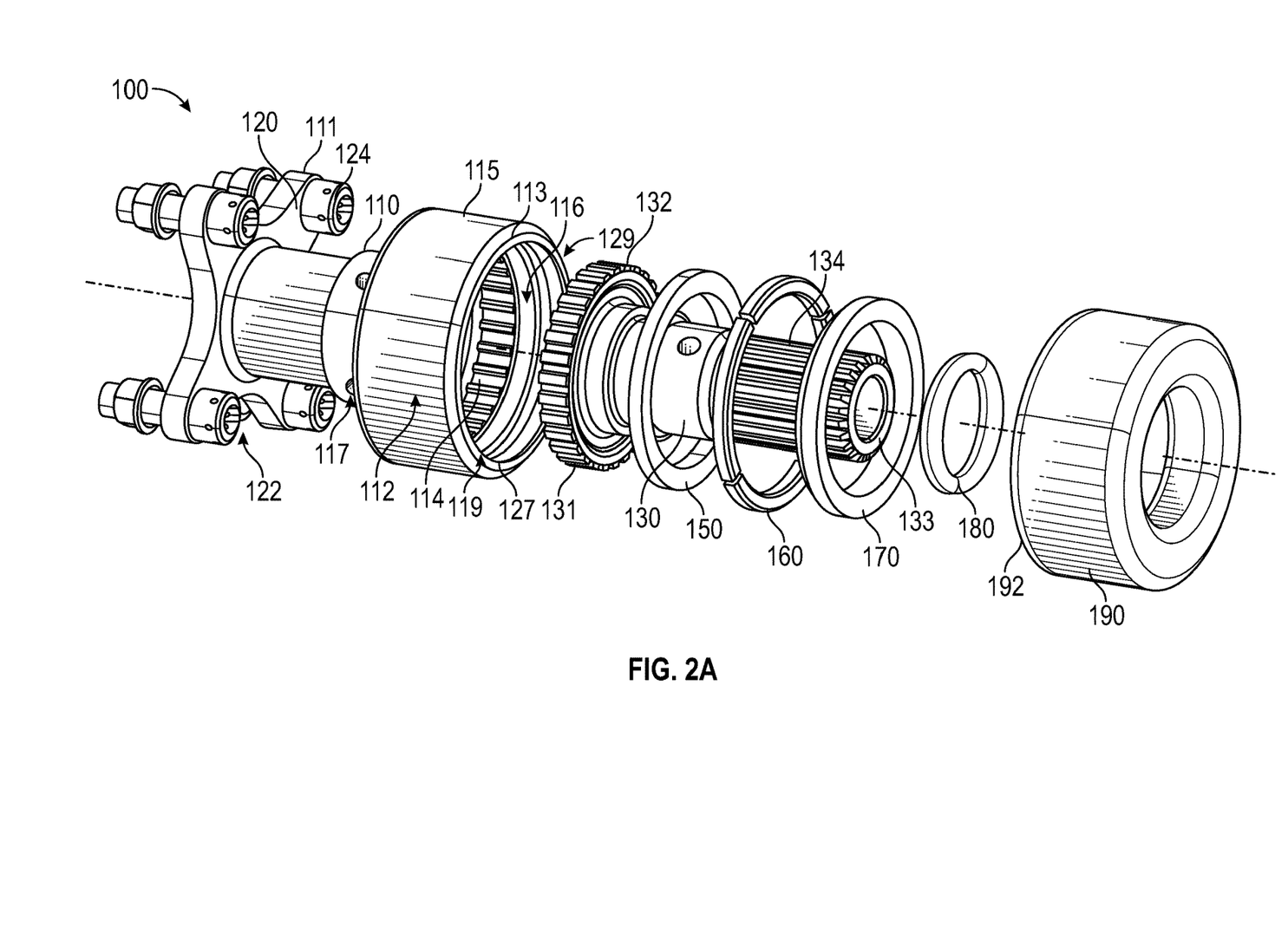
FIG. 2a is an exploded view of the splined coupling assembly having a retainer with a swaged first end, according to an embodiment of the present disclosure.
Figure 2B:
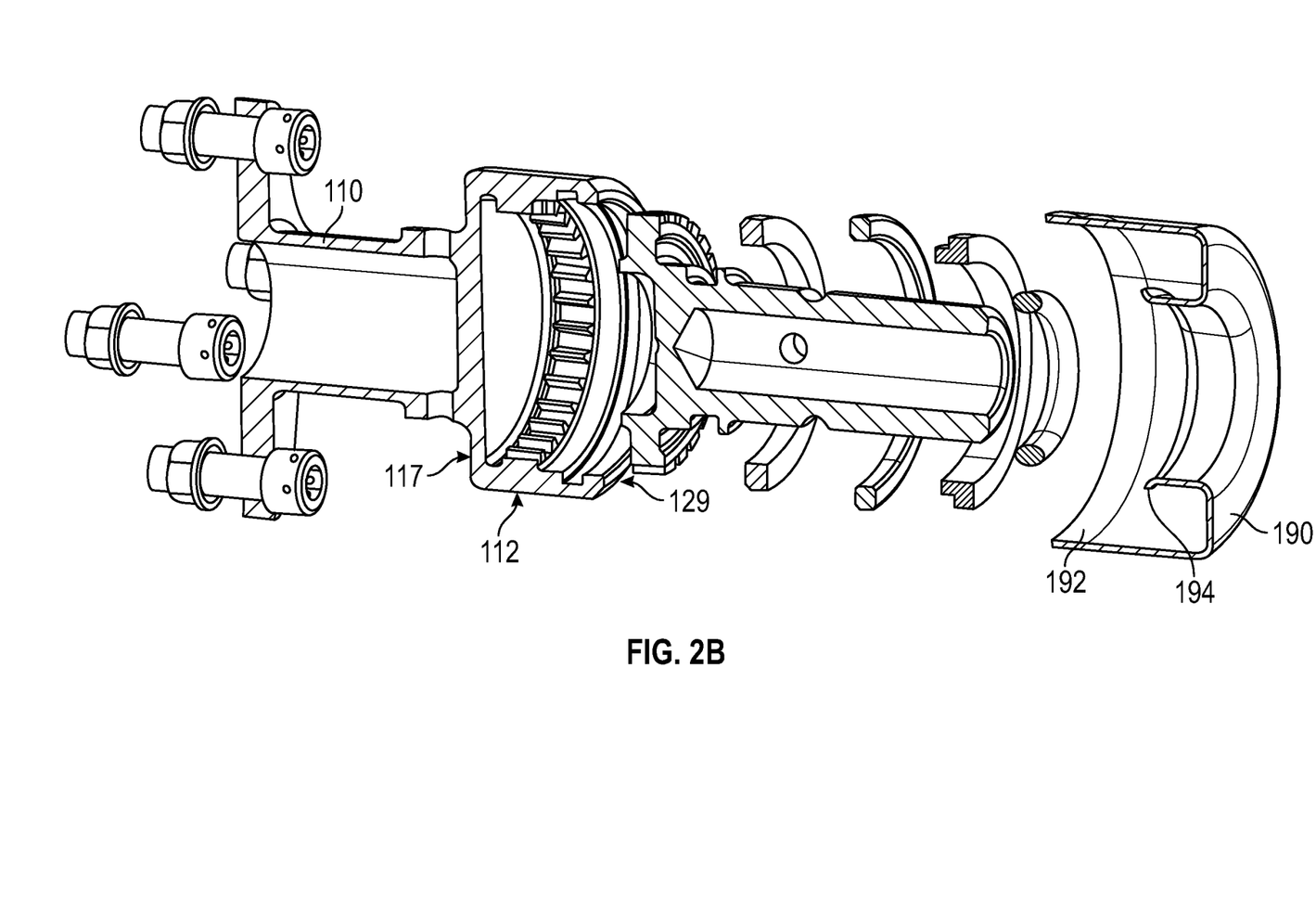
FIG. 2b is an exploded view of the splined coupling assembly having a retainer with an un-swaged first end, according to an embodiment of the present disclosure.
Figure 3A:
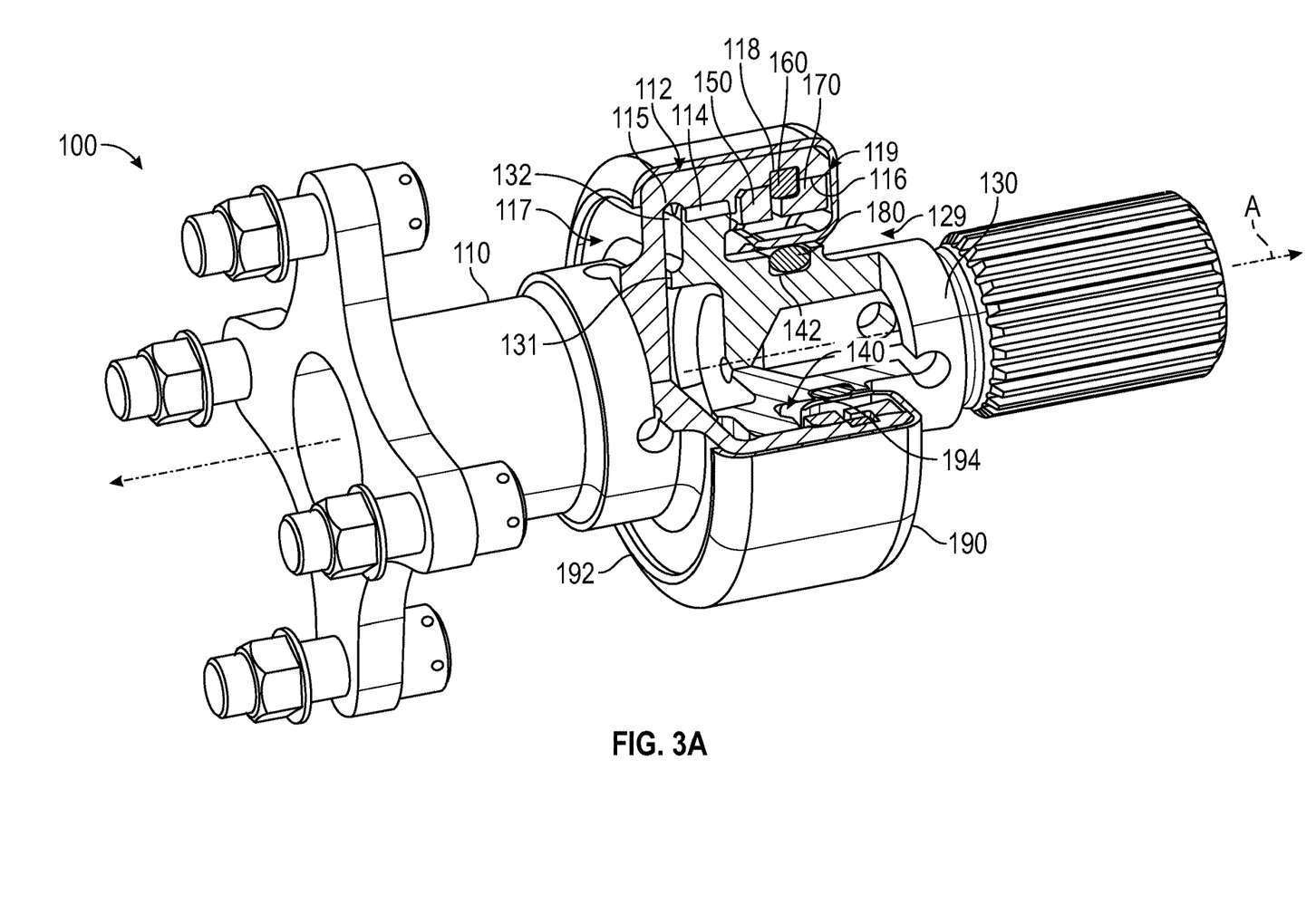
FIG. 3a is a cut-away view of the splined coupling assembly having a retainer with a swaged first end, according to an embodiment of the present disclosure.
Figure 3B:
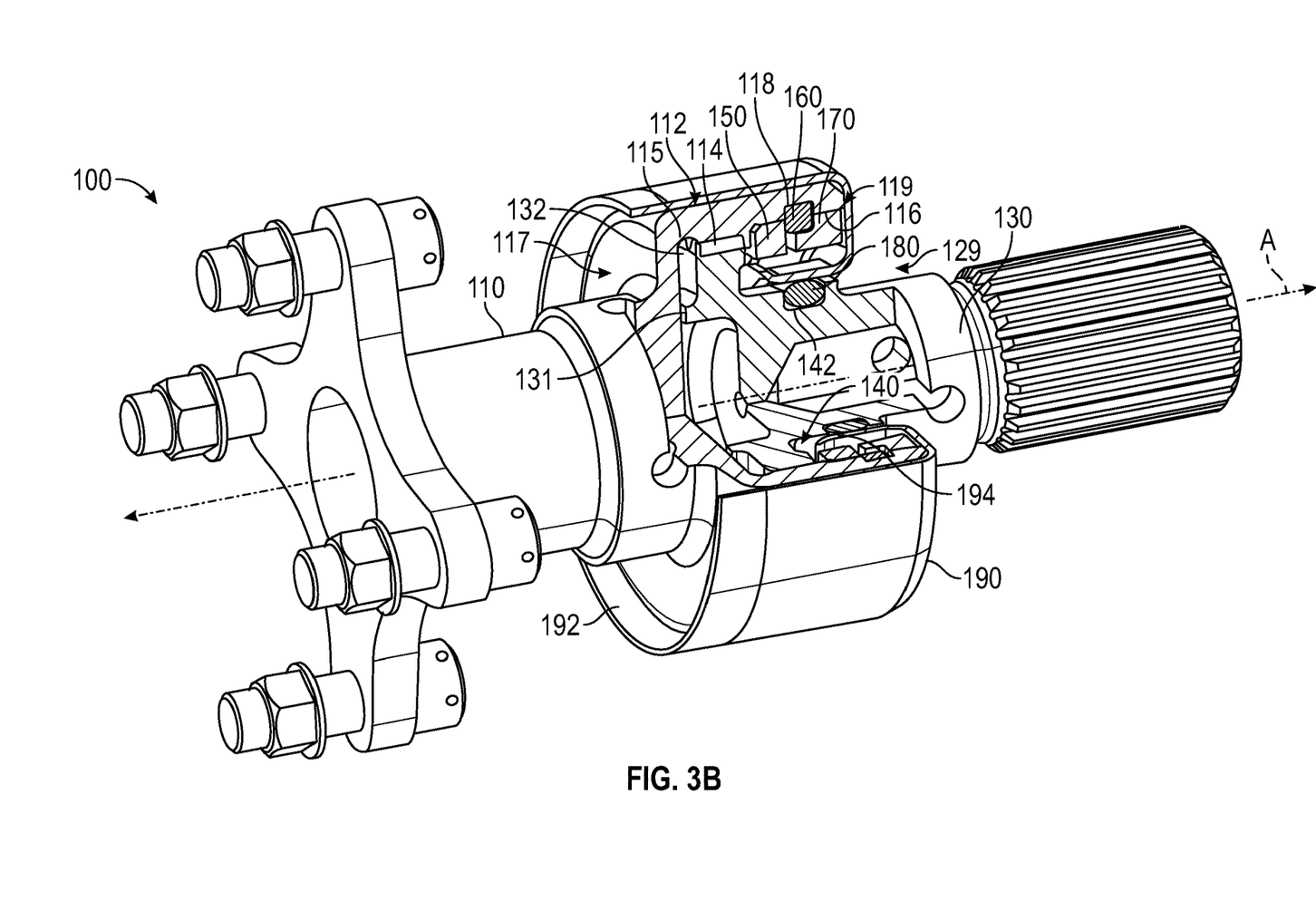
FIG. 3b is a cut-away view of the splined coupling assembly having a retainer with an un-swaged first end, according to an embodiment of the present disclosure.
Figure 4:
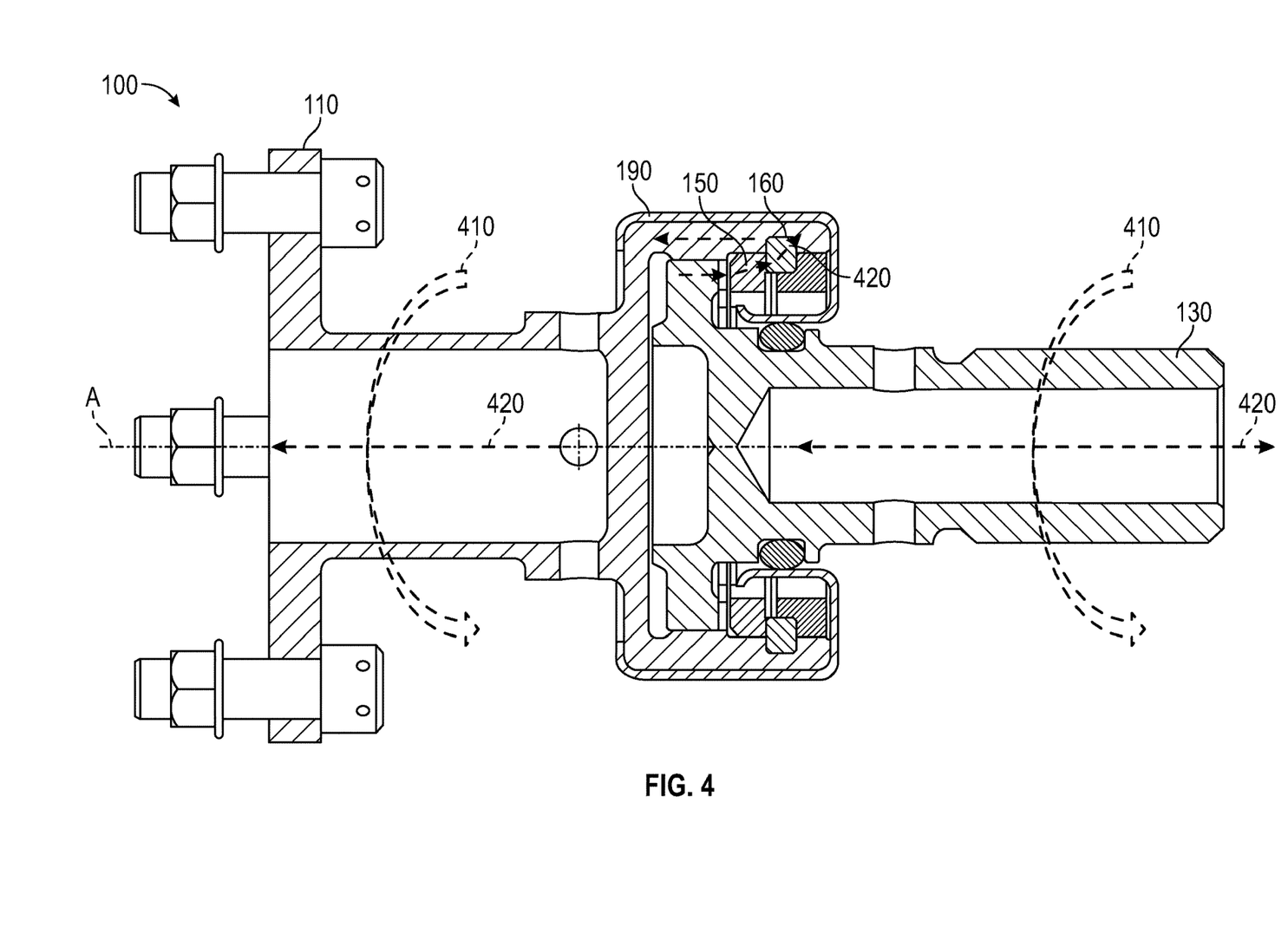
FIG. 4 is a cross-sectional illustration of the splined coupling assembly, according to an embodiment of the present disclosure.

Referring now to FIGS. 2a and 2b with continued reference to FIG. 1. FIGS. 2a and 2b illustrates an exploded view of the splined coupling assembly 100, according to an embodiment of the present disclosure. FIG. 2a shows a retainer 190 with a swaged first end 192 and FIG. 2b shows a retainer 190 with an un-swaged first end 192. The splined coupling assembly 100 is composed of a transfer housing 110, a transfer gear 130, a disc 150, a shear ring 160, a retainer ring 170, an O-ring seal 180, and a retainer 190. The transfer housing 110 includes a first side 111 and a second side 113 opposite the first side 111. The transfer housing 110 may be operably connected to a drive shaft 54 through one or more fasteners 124. In an embodiment, the fasteners 124 may be bolts. Each of the fasteners 124 may be located on a flange 120 in the first side 111. The flange 120 may include one or more through holes 122. Each of the one or more fasteners 124 may be located in a through hole 122. In an embodiment, there are four fasteners 124 and four through holes 122, as seen in FIGS. 2-4. The transfer housing 110 includes a tubular portion 115 located at the second side 113. The tubular portion 115 is tubular in shape and includes a first face 117, a second face 119 opposite the first face 117, a radially inward surface 116, and a radially outward surface 112. The second face 119 is located at the second side 113 and includes an orifice 127 that opens to an inner chamber 129. The inner chamber 129 may be defined by the radially inward surface 116. The tubular portion 115 also includes a plurality of internal splines 114 located on the radially inward surface 116 of the tubular portion 115. As seen in FIG. 2a, the transfer gear 130 includes a plurality of external splines 132 at a first end 131 and a plurality of external splines 134 at a second end 133. The shear ring 160 may be composed of one or more pieces for ease of assembly. In one non-limiting example, the shear ring 160 is composed of four pieces, as shown in FIG. 2a. If the shear ring 160 is composed of a single piece, then the retainer ring 170 may not be required to hold the shear ring 160 in place. Further, the retainer ring 170 may also not be required if another fastening device is used to secure the shear ring 160 in place, such as, for example a circlip. FIG. 2b shows a retainer 190 prior to being swaged to wrap around the first face 117. The second end 194 may be pre-swaged prior to the retainer 190 being slid over the radially outward surface 112 of the outer housing 110. Then once the retainer 190 is slid over the radially outward surface 112 and the second end is within the chamber 129, the first end 192 of the retainer 190 may be wrapped around the first face 117 as a final step in the swaging process.

Referring now to FIGS. 3a and 3b with continued reference to FIGS. 1, 2a, and 2b. FIGS. 3a and 3b illustrate a cut-away view of the splined coupling assembly 100, according to an embodiment of the present disclosure. FIG. 3a shows a retainer 190 with a swaged first end 192 and FIG. 3b shows a retainer 190 with an un-swaged first end 192. The splined coupling assembly 100 is configured to reduce relative axial movement between the transfer gear 130 and the transfer housing 110 in an axial direction A through efficient transfer of axial loads (see FIG. 4), such that the internal splines 114 maintain a meshed connection with the external splines 132. As seen in FIG. 3a, the inner chamber 129 of the tubular portion 115 of the transfer housing 110 partially encloses the first end 131 of the transfer gear 130, as seen in FIG. 3a. As also seen in FIG. 3a, the plurality of internal splines 114 are configured to mesh with the plurality of external splines 132 of the transfer gear 130. It is understood that embodiments disclosed herein are not limited to the transfer gear 130 having external splines 132 and the transfer housing 110 having internal splines 114, and thus the opposite arrangement may exist where the transfer gear 130 has internal splines that mesh with external splines of the transfer 110. The internal splines 114 project radially inward from the radially inward surface 116 of the tubular portion 115. The tubular portion 115 also includes a shear ring groove 118 in the radially inward surface 116. The shear ring 160 is configured to fit within the shear ring groove 118. As seen in FIG. 3a, the shear ring 160 in the shear ring groove 118 is located in between the retainer ring 170 and the disc 150. The retainer ring 170 is located proximate the second side 113 and the disc 150 is located proximate the internal splines 114, as shown in FIG. 3a.

The retainer 190 is configured to retain the retainer ring 170 in place (i.e. within the chamber 129 and proximate the second side 113) and form a sealing surface for the O-ring seal 180. The retainer 190 wraps around the tubular portion 115 of the transfer housing 110, the retainer ring 170, the shear ring 160, and the disc 150. The retainer 190 may be composed of a pliable metal that is swaged to wrap around the tubular portion 115 of the transfer housing 110, the retainer ring 170, the shear ring 160, and the disc 150. As seen in FIG. 3a, the retainer 190 may initiate on the first face 117, wrap around the radially outward surface 112 and the second face 119, and extend into the chamber 129 radially. The retainer 190 may extend into the chamber 129 inward of the retainer ring 170, the shear ring 160, and the disc 150. The retainer 190 terminates within the chamber 129 prior to reaching the external splines 132 and/or at the disc 150, as seen in FIG. 3a. FIG. 3b shows a retainer prior to being swaged to wrap around the first face 117. The second end 194 may be pre-swaged prior to the retainer 190 being slid over the radially outward surface 112 of the outer housing 110. Then once the retainer 190 is slid over the radially outward surface 112 and the second end is within the chamber 129, the first end 192 of the retainer 190 may be wrapped around the first face 117 as a final step in the swaging process. The O-ring seal 180 is located in a seal groove 142 on an outer surface 140 of the transfer gear 130. The O-ring seal 180 is interposed between the retainer 190 and the seal groove 142. The O-ring seal is 180 is configured to form a sealed connection with the retainer 190 to prevent fluid migration out of the chamber 129 in an axial direction A. The fluid may be used to lubricate the meshing of the internal splines 114 and the readily outward spline teeth 132. The fluid may be oil or any lubricating fluid known to one of skill in the art.

Referring now to FIG. 4 with continued reference to FIGS. 1-3. FIG. 4 illustrates a cross-sectional view of the splined coupling assembly 100, according to an embodiment of the present disclosure. During normal operation, rotational torque 410 may be transferred from a transmission 56 (See FIG. 1) to the transfer gear 130 through the external splines 132 (See FIGS. 2a and 2b) of the transfer gear 130. As shown in FIG. 4, during normal operation of the splined coupling assembly 100, the rotational torque 410 is transferred from the transfer gear 130 to the transfer housing 110 through the meshing of the internal splines 114 (See FIG.

3a) and the external splines 132 (see FIG. 3a). During operation of the spline coupling assembly 100, an axial load 420 may be experienced on the transfer gear 130 and then transferred to transfer housing 110. The axial load 420 occurs in the axial direction A and may be caused by wing bending or other punch loads. Advantageously, the design of the splined coupling assembly 100 is configured to reduce relative axial movement between the transfer gear 130 and the transfer housing 110 in the axial direction A when under the axial load 420 by allowing the axial load 420 to be transferred from the transfer gear 130 to the transfer housing 110 through the disc 150 and the shear ring 160, as seen in FIG. 4. It is understood that while a disc 150 is utilized in the examples illustrated in FIG. 4, embodiments disclosed herein are not limited to requiring a disc 150 to transfer the axial load 420. For example, the disc 150 may be removed by increasing the size of the shear ring 160 and the larger shear ring 160 will transfer the axial load 420 previously transferred by the disc 150. Once transferred to the transfer housing, the axial load 420 is then earthed to an aircraft structure through the fasteners 124. The aircraft structure may be the drive shaft 54.

Figure 5:
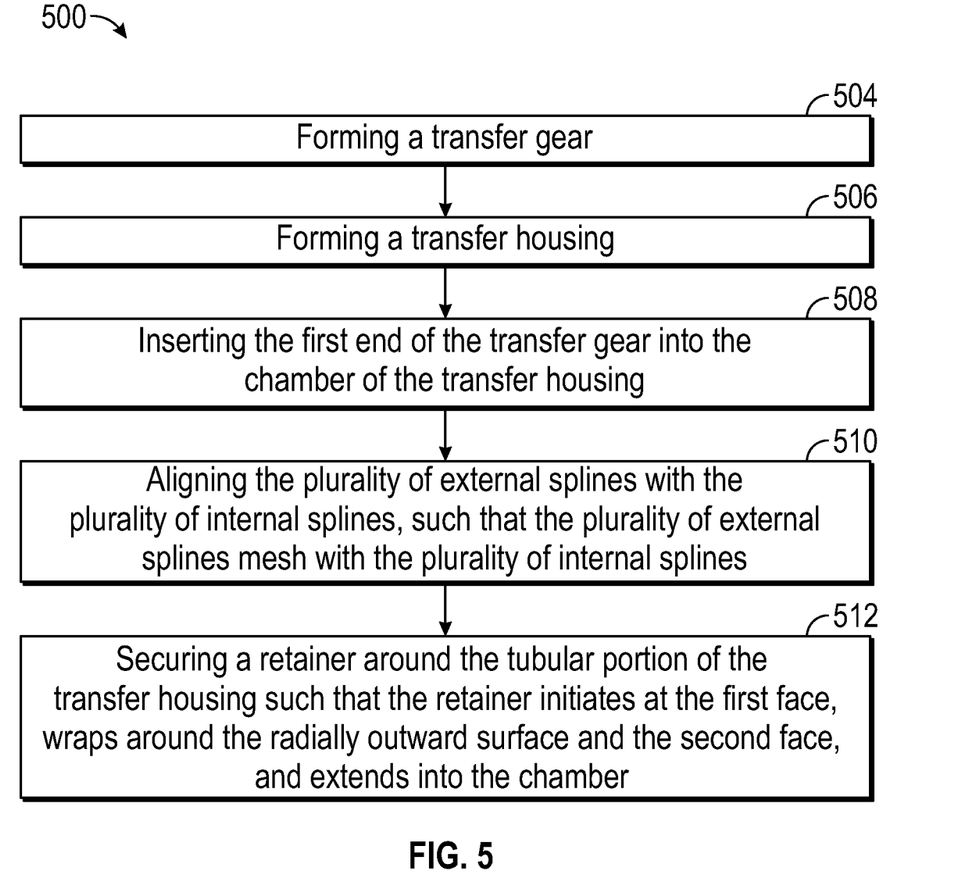
FIG. 5 is a flow process illustrating a method of manufacturing a splined coupling assembly, according to an embodiment of the present disclosure.

Referring now to FIG. 5, with continued reference FIGS. 1-4. FIG. 5 shows a flow process illustrating a method 500 of manufacturing a splined coupling assembly 100, according to an embodiment of the present disclosure. At block 504, a transfer gear 130 is formed having a first end 131, a second end 133 opposite the first end 131, a plurality of external splines 132 at the first end 131, and a plurality of external splines 134 at a second end 133. The method 500 may further comprise: forming a seal groove 142 on an outer surface 140 of the transfer gear 130; and inserting an O-ring seal 180 into the seal groove 142.

At block 506, a transfer housing 110 is formed having a first side 111, a second side opposite the first side 113 and a tubular portion 115 located at the second side 113. As discussed above, the tubular portion 115 comprises: a first face 117, a second face 119 opposite the first face 117, a radially inward surface 116, a radially outward surface 112 opposite the radially inward surface 116, and internal splines 114 in the radially inward surface 116 and configured to mesh with the external splines 132 of the transfer gear 130. As seen in FIGS. 2-3, the second face 113 includes an orifice 127 that opens to a chamber 129 defined by the radially inward surface 116. The method 500 may also comprise: forming a sheer ring grove 118 in the radially inward surface 116 of the transfer housing 110. The method 500 further comprises: forming a flange 120 at the first side 111 of transfer housing 110; and forming one or more through holes 122 in the flange 120.

At block 508, the first end 131 of the transfer gear 130 is inserted into the chamber 129 of the transfer housing 110. At block 510, the plurality of external splines 132 are aligned with the plurality of internal splines 114, such that the plurality of external splines 132 mesh with the plurality of internal splines 114. At block 512, a retainer 190 is secured around the tubular portion 115 of the transfer housing 110 such that the retainer 190 initiates at a location in the chamber 129 and wraps around the second face 119, the radially outward surface 112, and the first face 117. At block 512, the retainer 190 may be secured by sliding the retainer 190 around the tubular portion 115 of the transfer housing 110 such that a first end 192 of the retainer 190 extends past the first face 117 of the tubular portion 115 and a second end 194 of the retainer is located within the chamber 129; and swaging the first end 192 of the retainer 190 around the first face 117 of the tubular portion 115. The second end 194 is located opposite the first end 192. Prior to sliding the retainer 190 around the tubular portion 115, the second end 194 may be swaged such that the second end 194 forms a sealed connection with the O-ring seal 180 and wraps around and radially inward of the retainer ring 170, the shear ring 160, and the disc 150. The retainer 190 may terminate prior to reaching the external splines 113 and/or at the disc 150 as seen in FIGS. 3 and 4. The retainer 190 extends into the chamber 129 radially inward of the retainer ring 170, the shear ring 160, and the disc 150.

Additionally, the method 500 may further comprise: sliding a disc 150 into the chamber 129; inserting a sheer ring 160 into the sheer ring groove 118; and sliding a retainer ring 170 into the chamber 129. The disc 150 is located proximate the internal splines 114 and the retainer ring 170 is located proximate the second side 113 of the transfer housing 110. The sheer ring 160 is located in between the disc 150 and the retainer ring 170 in an axial direction A.

While the above description has described the flow process of FIG. 5 in a particular order, it should be appreciated that unless otherwise specifically required in the attached claims that the ordering of the steps may be varied.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A splined coupling assembly comprising:
   a transfer gear having a first end, a second end opposite the first end, and a plurality of splines at the first end;
   a transfer housing having a first side, a second side opposite the first side, and a tubular portion located at the second side, the tubular portion comprising: a plurality of splines, wherein the plurality of splines of the transfer housing are configured to mesh with the plurality of splines of the transfer gear;
   a shear ring located in a shear ring groove in the tubular portion;
   a retainer configured to retain the shear ring within the shear ring groove, wherein the tubular portion further comprises: a first face, a second face opposite the first face, a radially inward surface, and a radially outward surface opposite the radially inward surface, wherein the second face includes an orifice that opens to a chamber defined by the radially inward surface, and wherein the plurality of splines of the transfer housing are internal splines located on the radially inward surface and the plurality of splines of the transfer gear are external splines;

a retainer ring located within the chamber and proximate the second side; and a disc located within the chamber and proximate the plurality of internal splines, wherein the shear ring groove is located in the radially inward surface, and wherein the shear ring is located between the disc and the retainer ring, wherein the disc has a ring shape with an open center portion, wherein the transfer gear passed through the open center portion of the disc.

2. The splined coupling assembly of claim 1, wherein:
the retainer is configured to retain the retainer ring within the chamber and proximate the second side, wherein the retainer initiates at a location in the chamber and wraps around the second face, the radially outward surface, and the first face.

3. The splined coupling assembly of claim 2, wherein:
the retainer terminates prior to reaching the external splines.

4. The splined coupling assembly of claim 2, wherein:
the retainer extends into the chamber radially inward of the retainer ring, the shear ring, and the disc.

5. The splined coupling assembly of claim 4, further comprising:
an O-ring seal located in a seal groove on an outer surface of the transfer gear, wherein the O-ring seal is configured to form a sealed connection with the retainer to prevent lubricating fluid migration out of the chamber in an axial direction.

6. The splined coupling assembly of claim 4, wherein:
the retainer terminates at the disc.

7. A flight control surface actuation system comprising:
an actuator configured to actuate a flight control surface;
a transmission operably connected to the actuator;
a drive shaft operably connected to the transmission; and
a splined coupling assembly operably connecting the drive shaft to the transmission, the spline coupling assembly comprising:
a transfer gear having a first end, a second end opposite the first end, and a plurality of splines at the first end;
a transfer housing having a first side, a second side opposite the first side, and a tubular portion located at the second side, the tubular portion comprising: a plurality of splines, wherein the plurality of splines of the transfer housing are configured to mesh with the plurality of splines of the transfer gear;
a shear ring located in a shear ring groove in the tubular portion; and
a retainer configured to retain the shear ring within the shear ring groove,
wherein the tubular portion further comprises: a first face, a second face opposite the first face, a radially inward surface, and a radially outward surface opposite the radially inward surface, wherein the second face includes an orifice that opens to a chamber defined by the radially inward surface, and wherein the plurality of splines of the transfer housing are internal splines located on the radially inward surface and the plurality of splines of the transfer gear are external splines;

a retainer ring located within the chamber and proximate the second side; and a disc located within the chamber and proximate the plurality of internal splines, wherein the shear ring groove is located in the radially inward surface, and wherein the shear ring is located between the disc and the retainer ring, wherein the disc has a ring shape with an open center portion, wherein the transfer gear passes through the open center portion of the disc.

8. The flight control surface actuation system of claim 7, wherein:
the retainer is configured to retain the retainer ring within the chamber and proximate the second side, wherein the retainer initiates at a location in the chamber and wraps around the second face, the radially outward surface, and the first face.

9. The flight control surface actuation system of claim 7, wherein the first side of the transfer housing further comprises:
a flange located at the first side, the flange including one or more through holes.

10. The flight control surface actuation system of claim 9, further comprising:
one or more fasteners operably connecting the first side of the transfer housing to the drive shaft, wherein each fastener is located in one of the one or more through holes.

11. The flight control surface actuation system of claim 7, wherein the transfer gear further comprises:
a plurality of external splines at the second end of the transfer gear.

12. The flight control surface actuation system of claim 11, wherein the splined coupling assembly is operably connected to the transmission through the external splines at the second end.

13. A method of manufacturing a splined coupling assembly, the method comprising:
forming a transfer gear having a first end, a second end opposite the first end, and a plurality of external splines at the first end;
forming a transfer housing having a first side, a second side opposite the first side, and a tubular portion located at the second side, the tubular portion comprising a first face, a second face opposite the first face, a radially inward surface, a radially outward surface opposite the radially inward surface, and a plurality of internal splines in the radially inward surface, wherein the plurality of internal splines are configured to mesh with the external splines of the transfer gear, and wherein the second face includes an orifice that opens to a chamber defined by the radially inward surface;
forming a shear ring groove in the radially inward surface of the transfer housing;
sliding a disc into the chamber, the disc being located proximate the internal splines;
inserting a shear ring into the shear ring groove;
sliding a retainer ring into the chamber, the retainer ring being located proximate the second side of the transfer housing, wherein the shear ring is located in between the disc and the retainer ring in an axial direction, and wherein the disc has a ring shape with an open center portion, wherein the transfer gear passes through the open center portion of the disc;

inserting the first end of the transfer gear into the chamber of the transfer housing;

aligning the plurality of external splines with the plurality of internal splines, such that the plurality of external splines mesh with the plurality of internal splines; and securing a retainer around the tubular portion of the transfer housing such that the retainer initiates at a location in the chamber and wraps around the second face, the radially outward surface, and the first face.

14. The method of claim 13, wherein the securing further comprises:

sliding the retainer around the tubular portion of the transfer housing such that a first end of the retainer extends past the first face of the tubular portion and a second end of the retainer is located within the chamber, wherein the second end is located opposite the first end; and swaging the first end of the retainer around the first face of the tubular portion.

15. The method of claim 13, wherein the securing further comprises:

swaging a second end of the retainer such that when the second end is within the chamber the second end forms a sealed connection with an O-ring seal and wraps around and radially inward of the retainer ring, the shear ring, and the disc, wherein the second end is located opposite a first end of the retainer;

sliding the retainer around the tubular portion of the transfer housing such that the first end of the retainer extends past the first face of the tubular portion and the second end is located within the chamber; and swaging the first end of the retainer around the first face of the tubular portion.

* * * * *